May 3, 1966 H. E. KELCHNER 3,249,709
SHAFT ROTATION SIGNALLING SWITCH DEVICE
Filed April 16, 1962 2 Sheets-Sheet 1
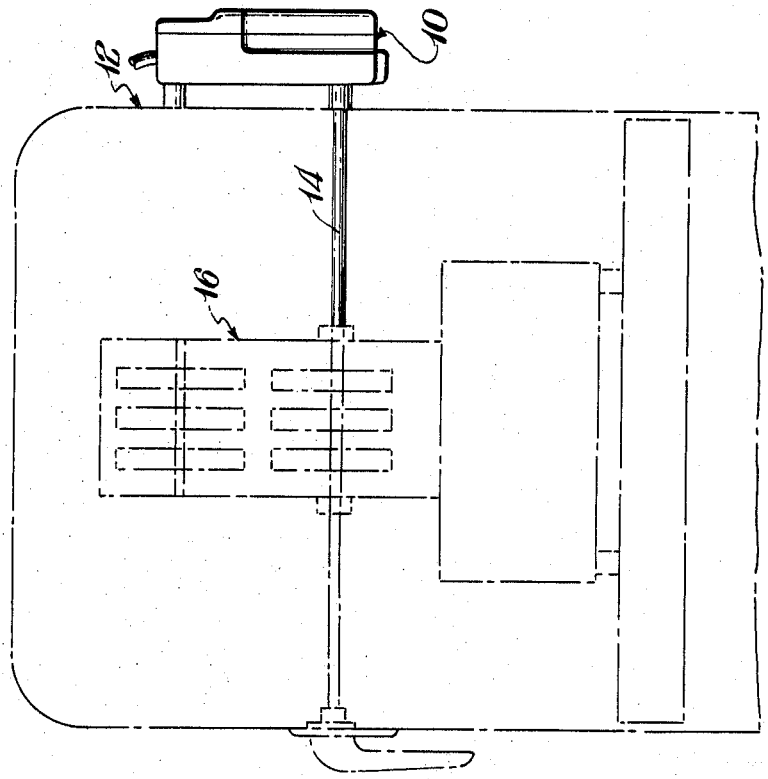
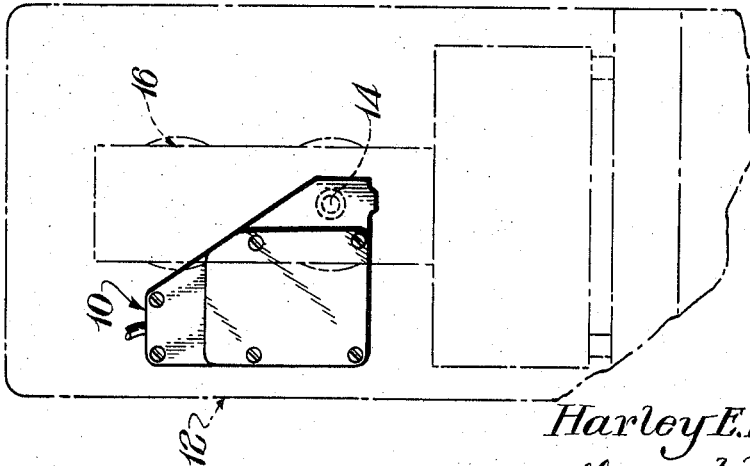
INVENTOR
*Harley E. Kelchner*
BY *Connolly and Hutz*
ATTORNEYS May 3, 1966

H. E. KELCHNER 3,249,709

SHAFT ROTATION SIGNALLING SWITCH DEVICE

Filed April 16, 1962

INVENTOR
Harley E. Kelchner
BY Connolly and Hutz
ATTORNEYS

United States Patent Office
3,249,709
Patented May 3, 1966

---

3,249,709
SHAFT ROTATION SIGNALLING SWITCH DEVICE
Harley E. Kelchner, King of Prussia, Pa., assignor to Symington Wayne Corporation, a corporation of Maryland
Filed Apr. 16, 1962, Ser. No. 187,813
7 Claims. (Cl. 200—61.46)

This invention relates to a device for providing signals in accordance with the rotation of a shaft, and it more particularly relates to such a device for attachment to a shaft of an indicating device to provide a remote indication of said rotation.

A great number of indicating devices are in use for indicating increments of quantity such as amounts of commodities or products dispensed and also their cost. Such indicators are used for example in gasoline service stations for registering and indicating the number of gallons dispensed and their cost. It is sometimes convenient to transmit the information provided by these indicators to positions remote from the originating indicators, and a system describing how such information is transmitted and utilized is described in U.S. Patent 3,030,015. In FIGS. 1, 2, 6 and 7 of that patent are shown signalling devices 36 connected to shafts of indicating computors 16 of gasoline dispensers to provide a signal each time these indicator shafts rotate through a predetermined angular phase, such as one rotation. It is important that such devices should not remain stopped in an actuating position when the shaft that drives them stops because this might generate two signals during successive dispensing operations where only one should have been generated.

An object of this invention is to provide a simple, economical and dependable shaft rotation signalling device.

Another object is to provide such a device which cannot be stopped in a switch-actuating condition.

In accordance with this invention the center of gravity of a rotatably mounted switch-actuating mass is displaced from its axis of rotation to cause the center of gravity to fall from raised positions. A motion-transmitting device connects this mass to the shaft whose rotation is to be signaled, and it is arranged to disengage from the mass when its center of gravity is falling from raised positions. Rotation of this mass causes an associated electrical switch to actuate each time the mass passes through a predetermined angular phase which is arranged to occur while the center of gravity of the mass is falling from raised positions. This prevents the mass from remaining in a position in which it is actuating the switch when the shaft whose rotation it is signalling stops rotating.

Novel features and advantages of the present invention will become apparent to one skilled in the art from a reading of the following description in conjunction with the accompanying drawings wherein similar reference characters refer to similar parts and in which:

FIG. 1 is a front view in elevation of one embodiment of this invention mounted upon the side of a gasoline dispenser in connection with a shaft from its computing indicator;

FIG. 2 is a side view in elevation of the embodiment shown in FIG. 1;

Figure 7:
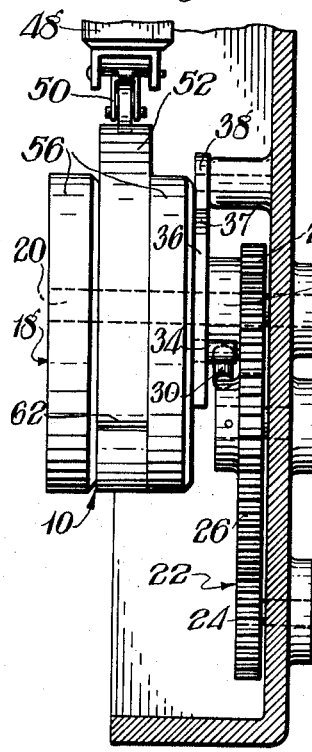
FIG. 7 is a cross-sectional view taken through FIG. 6 along the line 7—7.

In FIGS. 1 and 2 is shown a shaft rotation signalling device 10 mounted upon the side of a gasoline dispenser 12. A portion of device 10 is connected as is later described in detail to shaft 14 extending from computor 16. Shaft 14 is for example connected to the quantity or gallon indicating section of computor 16, and it rotates in accordance with the number of gallons dispensed, for example at a rate of one revolution per gallon.

The mechanism within device 10 is shown in FIGS. 3–7, and it includes a rotatably mounted mass 18, whose approximate center of gravity designated "X" is displaced from axis of rotation 20 of mass 18 to cause center of gravity "X" to fall from raised positions. A motion-transmitting means 22 connects shaft 14 to mass 18, and it includes gears 24, 26, 28, driving pin 30 upon the hub 32 of gear 28 and contacting surface element or driven pin 34 connected to mass 18. Pin 34 is for example mounted upon ratchet disc 36 which is secured to mass 18.

Pawl 38 is engaged with the arc of ratchet teeth 37 upon disc 36 by spring 40 which reacts against anchor pin 42 secured to the casing 44 of device 10. Ratchet disc 36 and pawl 38 allow movement of mass 18 only in the forward direction indicated by arrow 46 to prevent mass 18 from swinging back after the free fall.

An electrical switch 48 is secured within casing 44 adjacent mass 18, and it includes a follower type of actuating arm 50 which is engaged with cam surface 52 upon a peripheral portion of mass 18.

Cam surface 52 as shown in FIG. 7 is formed upon a central disc-shaped portion 54 of mass 18 which is of a somewhat circular configuration. The unbalancing of the center of gravity "X" is facilitated by the application of semi-circular weights 56 upon the sides of central disc 54 which is also cut out at area 58 opposite the dispositions of weights 56 to help unbalance mass 18.

Figure 3:
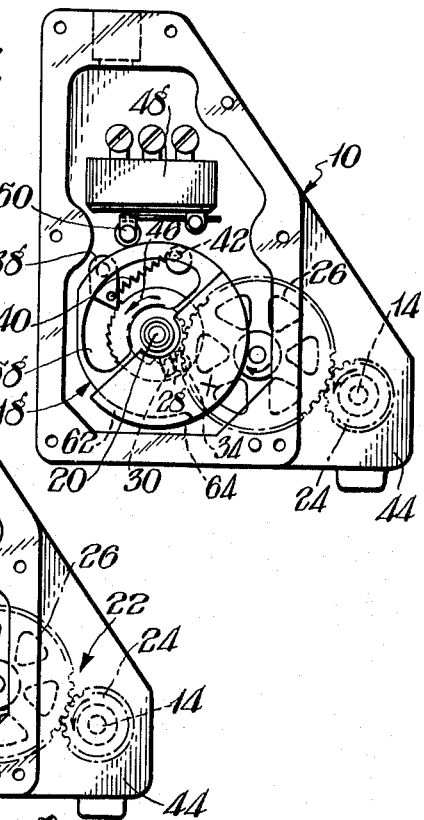
Figure 6:
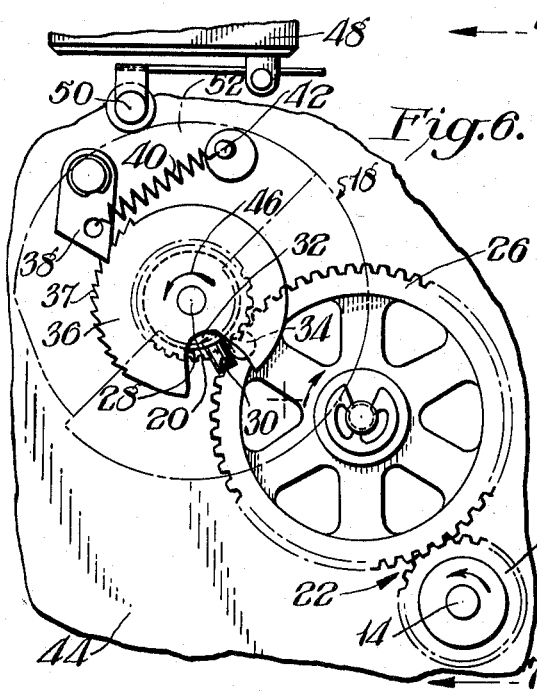
FIG. 6 is an enlarged front view in elevation of portions of the device shown in FIGS. 3–5.

The operation of the device is best described by reference to the successive phases of operation illustrated in FIGS. 3, 4 and 5. FIG. 3 shows an initial stage of operation in which rotation of shaft 14 transmitted through motion-transmitting means 22 engages driving pin 30 upon hub 32 of gear 28 with the surface of driven pin 34 on mass 18. Center of gravity "X" is accordingly raised from the lower position shown in FIG. 3 through the unbalanced raised position of FIG. 4 to the freely fallen position shown in FIG. 5 in which pawl 38 is engaged with ratchet teeth 37 upon ratchet disc 36 to prevent mass 18 from slipping backwardly and oscillating after it has dropped. As mass 18 rotates through the position shown in FIG. 4, actuating follower 50 actuates by rolling down fall 64 into low dwell 62 in cam surface 52. Before this actuating moment, center of gravity "X" has passed over top center, which causes mass 18 to rotate ahead of driving pin 30 if the falling speed of center of gravity "X" is faster than the speed of rotation of driving pin 30, or if shaft 14 should stop while center of gravity "X" is in a raised position past top center. The duration of signal is determined by the angle of arc included by low dwell 62.

Figure 4:
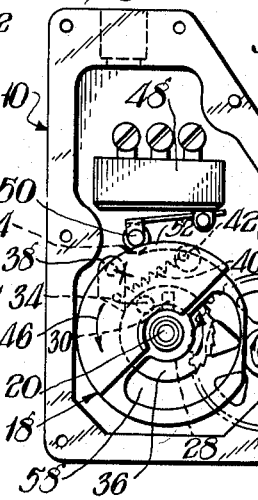
FIGS. 3–5 are front views in elevation of internal portions of the embodiment shown in FIGS. 1 and 2 in various phases of operation.
Figure 5:
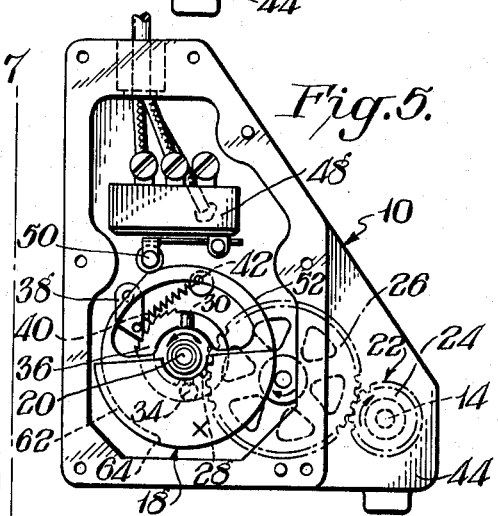

FIG. 4 shows a position intermediate between FIGS. 3 and 5 in which driven pin 34 is starting to fall ahead of pin 30. The displaced gravity of mass 18 in combination with pins 30 and 34 and with pawl 38 and ratchet teeth 37 act as a one-way drive in that pin 30 drives mass 18 in the direction indicated when mass 18 moves from the position shown in FIG. 3 to that shown in FIG. 4. Gravity then causes pin 34 to move ahead of pin 30 when mass 18 continues to move in the indicated direction from the position shown in FIG. 4 to that of FIG. 5. When mass 18 is in the position shown in FIG. 5 pawl 38 engages teeth 37 to prevent backlash until pin 30 again contacts pin 34. Mass 18 thus moves only in the forward direction by the one-way drive.

FIG. 5 shows the extreme freely fallen position of center of gravity "X" in which the engagement of pawl 38 with ratchet disc 36 prevents it from oscillation by holding it in slightly raised position. The extent of fall of center of gravity "X" is indicated in FIG. 5 by the great amount of movement of driven pin 34 ahead of driving pin 30.

In FIG. 4 driven pin 34 is moving away from contact with driving pin 30 by virtue of the free dropping of center of gravity "X" of mass 18. This prevents follower 50 from remaining on the dwell of cam surface 52 even though shaft 14 might have stopped. This arrangement of the predetermined switch-actuating angular phase of mass 18 at an unbalanced raised position of the center of gravity "X" of mass 18 accordingly prevents mass 18 from remaining in the actuating position at any time.

What is claimed is:

1. A shaft rotation signalling device comprising a rotatably mounted mass, the center of gravity of said mass being displaced from its axis of rotation to cause said center of gravity to fall from raised positions, motion-transmitting means connecting said shaft to said mass, said motion-transmitting means being arranged to allow said mass to disengage from it when said center of gravity is falling from raised positions, an electrical switch, actuating means coupling said mass to said switch for causing said switch to actuate each time said mass passes through a predetermined angular phase when said center of gravity is falling from raised positions whereby said mass is prevented from remaining in a position in which it is actuating said switch, and said motion-transmitting means including a one-way drive in the forward direction whereby said mass becomes disengaged from said shaft while its center of gravity is falling from said raised positions.

2. A device as set forth in claim 1 wherein said mass comprises a substantially circular mass having more weight on one semicircular portion than the other.

3. A device as set forth in claim 2 wherein said circular mass incorporates a circular central disc and a pair of semicircular weights attached to opposite sides of said disc.

4. A device as set forth in claim 1 wherein said motion-transmitting means includes a driving pin upon said shaft and a contacting surface upon said mass which is free to move ahead of the path of movement of said pin as said center of gravity is falling.

5. A device as set forth in claim 1 wherein a pawl and ratchet reacts between said mass and a stationary portion of said device to allow said mass to rotate only in one direction after said center of gravity has fallen from said raised position to prevent it from oscillating.

6. A device as set forth in claim 1 wherein said actuating means comprises cam means upon a periphery of said mass and follower means upon said switch engaged with said cam means.

7. A device as set forth in claim 6 wherein said cam means incorporates a switch-actuating surface with which said follower is engaged to actuate said switch while the heavier side of said mass is falling from raised positions.

References Cited by the Examiner

UNITED STATES PATENTS 1,774,966  9/1930  Eaton _____ 200—97
2,128,205  8/1938  Field _____ 200—97

BERNARD A. GILHEANY, Primary Examiner.

E. JAMES SAX, ROBERT K. SCHAEFER, BENJAMIN DOBECK, Assistant Examiners.